United States Patent Office 3,433,701
Patented Mar. 18, 1969

3,433,701
WATER RESISTANT POLYVINYL ACETATE
ADHESIVE COMPOSITIONS
Walter B. Armour, Plainfield, N.J., assignor to National Starch and Chemical Corporation, New York, N.Y., a corporation of Delaware
No Drawing. Filed May 18, 1965, Ser. No. 456,843
U.S. Cl. 161—198                    6 Claims
Int. Cl. B32b 27/04, 27/06

ABSTRACT OF THE DISCLOSURE

An adhesive composition characterized by its ability to rapidly set at ambient or elevated temperatures and capable of yielding dry films which exhibit optimum water resistance and high strength; said composition comprising a mixture of a stabilized aqueous vinyl acetate polymer emulsion, a B-stage phenolic resin and, as an optional ingredient, an acidic, metal salt curing agent.

---

This invention relates to the preparation of novel, water resistant, rapid setting adhesive compositions and to the adhesives thus prepared.

It is the object of this invention to provide stable, polyvinyl acetate aqueous emulsion compositions capable of yielding adhesive bonds which exhibit optimum water resistance and high strength. A further object of this invention involves the preparation of adhesives which are characterized by their ability to rapidly set at ambient or elevated temperatures and which are, thus, suitable for diverse applications. Other objects will become apparent to the practitioner from the following detailed description.

As is well known in the art, modern adhesives are prepared from a wide variety of synthetic organic polymers, many of which are often blended so as to provide adhesive compositions displaying specific properties desired by the practitioner. Most adhesives are ordinarily classified as being either thermoplastic or thermosetting. Thus, thermosetting adhesives are formulated with resins which, by means of a chemical reaction, solidify or set on heating and cannot be softened by further heating. Thermoplastic adhesives, on the other hand, are made with resins which may be softened by heat, and thereupon regain their original properties upon cooling.

Aqueous emulsions of polyvinyl acetate are widely used as adhesives. Often such emulsions can be used with little, if any, modification. Usually, however, it is necessary to alter either their physical properties and/or their application characteristics. Thus, various modifiers may be included in order to increase viscosity and setting speeds, to improve machinability and remoistenability, to provide colorless glue lines, etc. Despite this potential for improvement, the adhesive bonds derived from conventional polyvinyl acetate emulsions are still inherently poor with respect to their water resistance. Thus, this property, which is required in adhesive bonds which are to be exposed to moisture in ordinary usage or which may be exposed to the excessive moisture and varying temperature conditions encountered during outdoor exposure, has been generally inadequate in the polyvinyl acetate emulsion adhesives heretofore available.

It is known that A-stage phenolic resins may be added to various polyvinyl acetate emulsions in order to impart improved water resistance. These A-stage phenolics are intermediates in phenol-formaldehyde condensation reactions. Thus, when such condensation reactions are conducted in the presence of alkaline catalysts, phenol alcohols are initially formed which are capable of polymerizing into high molecular weight molecules containing an appreciable number of methylol groups; each methylol group representing a potential crosslink site. Thus, if the reaction is terminated in its early stages, comparatively short, linear, functional molecules, that are fusible and soluble in both water and conventional solvents, will be produced. The latter condensates are known as resoles or A-stage phenolic resins. If the polymerization is allowed to continue, higher molecular weight, mildly crosslinked resins at the B or resitole stage are produced, which are still fusible and soluble in conventional organic solvents such as acetone but which are no longer soluble in water or alkali solution. Allowing the latter reaction to run its full course results in extensively crosslinked, fully cured, insoluble, infusible resites or C-stage phenolic resins.

Thus, one can see that A-stage phenolic resins are often chosen for use as additives for polyvinyl acetate emulsion adhesives because of their high water solubility and resultant compatibility with the polyvinyl acetate emulsion adhesives because of their high water solubility and resultant compatibility with the polyvinyl acetate aqueous emulsions as well as for their potential crosslinking ability. Despite these advantages, however, the high water solubility of the A-stage phenolic resins is, in fact, a decided disadvantage with regard to the degree of water resistance of the resulting adhesives, especially where a high ratio of A-stage phenolic resin to polyvinyl acetate resin solids is used and/or where room temperature curing conditions are to be utilized.

B-stage phenolic resins, although inherently less water sensitive than the A-stage phenolics, have not, heretofore, been utilized for the purpose of increasing the water resistance of polyvinyl acetate emulsion adhesives because of their high degree of incompatibility with such emulsions. This incompatibility is due to the inherent water insolubility of the B-stage phenolics. Although stable B-stage phenolic resin solutions may be prepared using a variety of organic solvents, either alone or in conjunction with water, when such solutions are admixed with aqueous polyvinyl acetate emulsions, the usual result is the coagulation of such polyvinyl acetate emulsions.

The present invention, surprisingly, provides smooth, stable, water resistant adhesive compositions comprising the combination of stabilized polyvinyl acetate aqueous emulsions with B-stage phenolic resins. When reference is here made to the term "stabilized" polyvinyl acetate emulsions, the latter term is meant to denote vinyl acetate homo- or copolymer emulsions which have been conditioned to render the same compatible with and which can then readily tolerate the addition thereto of a solution of a B-stage phenolic resin in an organic solvent such as methanol, ethanol, propanol or acetone; the latter tolerance being directly indicated by the absence of any coagulation upon such admixture. In addition, the compositions of this invention also contain acidic, metal salt curing agents.

The presence of the acidic, metal salt curing agents in these adhesive compositions has been shown to be effective in decreasing the water sensitivity of the adhesive derived therefrom. Thus, while the presence of hydrophillic emulsifiers in polyvinyl acetate emulsions ordinarily has adverse effects upon the water resistance of the adhesives ultimately derived from the polymer emulsion containing these materials, the adhesives resulting from the products of this invention are found, in contrast, to surprisingly retain their excellent adhesive properties and physical structure even after prolonged exposure to moisture.

In addition, the adhesive products of this invention yield tacky films which do not require the application of excessive pressure for their successful bonding to a wide variety of solid substrates.

The novel adhesive compositions of this invention are thus seen to overcome all of the deficiencies found in the previously described polyvinyl acetate emulsion systems. Therefore, it is now possible for the practitioner to rapidly effect the lamination of various substrates at ambient temperatures, while, nonetheless, developing an outstanding degree of water resistance in the resulting adhesive bonds.

The stabilized vinyl acetate homo—or copolymer emulsions applicable for use in the process of this invention are prepared either by carefully controlling certain variables in the polymerization procedure or by utilizing certain stabilizing comonomers therein. Though not required for adequate stabilization, the two methods may be combined in the polymerization procedure. With either of the latter procedures for obtaining the stabilized vinyl acetate aqueous emulsion polymers, one may employ any of the aqueous emulsion polymerization techniques well known to those skilled in the art.

Thus, when utilizing the first procedure involving the control of certain process variables, the polymerization is carried out at relatively high temperatures and in the presence of a hydrogen peroxide catalyst. It has been determined that when vinyl acetate, in an emulsion containing polyvinyl alcohol as a hydrocolliod emulsifier therein, is polymerized at temperatures exceeding about 85° C. and in the presence of hydrogen peroxide as a free radical initiating catalyst, the resulting polymer emulsion is considerably more stable than if lower temperatures or other free radical type catalysts were used in the polymerization procedure. The reason for this enhanced stability has not been definitely established but it is believed that the combination of high temperatures and the hydrogen peroxide catalyst favors the grafting of the polyvinyl acetate onto the polyvinyl alcohol thereby enhancing the stability of the the resulting emulsion.

When utilizing the second procedure, stabilization of vinyl acetate polymer emulsions is achieved by the utilization of selected comonomers in the polymerization procedure. Thus, the vinyl acetate copolymers which may be used in the process of this invention comprise copolymers containing vinyl acetate in combination with at least one comonomer selected from the group consisting of: (1) alpha, beta-unsaturated carboxylic acids such as maleic, acrylic and crotonic acids; (2) lower, mono-alkyl esters of alpha, beta-unsaturated dicarboxylic acids such as ethyl acid maleate, (3) hydroxyalkyl esters of alpha, beta-unsaturated carboxylic acids such as hydroxyethyl acrylate, hydroxypropyl acrylate and hydroxyethyl methacrylate; and, (4) amides of alpha, beta-unsaturated carboxylic acids and their N-alkylol derivatives such as acrylamide and N-methylol acrylamide. It is preferred that the total comonomer concentration, i.e. the monomer or monomers other than vinyl acetate, should not exceed about 20%, by weight, of the resulting copolymer. Thus, the ratio of vinyl acetate to comonomer should range from about 80:20 to 100:0, by weight.

The emulsifying agent which is preferred for use in preparing the vinyl acetate homo—or copolymer emulsions applicable for use in this invention is polyvinyl alcohol. The polyvinyl alcohol is usually present in the initial monomer charge in concentrations ranging from about 2 to 12%, as based on the weight of the monomer charge. The resulting vinyl acetate emulsion polymers may contain any total resin solids content which may be desired by the practitioner although the practical total resin solids range is from about 40 to 60%, by weight.

The B-stage phonolic resins applicable for use in this invention may be prepared by means of any conventional phenolaldehyde condensation reaction; the procedure for preparing such phenolic resins being well known to those skilled in the art. For the purposes of this invention, the B-stage phenolic resins are utilized in isopropanol solutions, although other solvents such as methanol, ethanol, acetone, etc., may also be utilized, if desired. The total solids content of these B-stage phenolic resin solutions may range from about 30 to 60%, by weight.

In preparing the adhesive compositions of this invention, it is merely necessary first to combine, by mixing, the aqueous vinyl acetate homo— or copolymer emulsion with the B-stage phenolic resin solution. No heating or other special treatment is required for this operation. With regard to operable proportions, the concentration of B-stage phenolic resin solids should be in a range of from about 30 to 130 parts, by weight, per 100 parts, by weight, of the vinyl acetate homo— or copolymer resin solids. Compositions containing less than 30 parts, by weight, of B-stage phenolic resin solids show inadequate water resistance while compositions exceeding 130 parts, by weight, of these phenolics display a marked decrease in rapid setting characteristics and thus approach the undesirable characteristics of conventional phenolic resin system. Optimum results have been attained with adhesive compositions containing about 50 parts, by weight, of phenolic resin solids and about 100 parts, by weight, of vinyl acetate homo— or copolymer resin solids. The resulting formulations are found to be extremely stable and may be stored for prolonged periods with no danger of any premature curing or other spoilage.

The addition of acidic, metal salt curing agents is desired in order to accelerate the cure of the vinyl acetate polymer emulsion-phenolic resin combination. Thus, these curing agents facilitate the curing or crosslinking of the adhesive coatings or films derived from the adhesive compositions of this invention thereby enhancing their water resistance.

The preferred curing agents for use in the process of this invention comprise acidic, metal salts selected from the group consisting of chromic nitrate, chromic perchlorate, aluminum nitrate, and aluminum chloride. These curing agents may be added to the adhesives of this invention at the time the latter formulations are to be utilized, or, if added earlier, they should be introduced no sooner than about 48 hours prior to such utilization. The use of these acidic, metal salts aids in instilling water resistance to a far greater degree than is possible with the use of the corresponding free acids.

The proportion of acidic, metal salt curing agent which is added will depend upon the rate of cure which is desired in the final product but a practical range has been found to be from about 0.015 to 0.060 gram equivalents of curing agent (anhydrous basis) for each 100 grams of the total weight of the blend of the vinyl acetate polymer emulsion and the B-stage phenolic resin solution.

The adhesives of this invention may be used in the bonding, saturation or lamination of many types of porous substrates, such as wood, tempered hardboard, textiles, leather, paper, cement, asbestos board and related products, as well as for the manufacture of such products as plywood and wood particle board. One application for which our adhesives have proven to be particularly useful is for the bonding of so-called "finger joints." These finger joints are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking, mating fingers which are subsequently glued together.

Another interesting application for these adhesives involves their use in the construction of laminated beams for arches and other supporting structures wherein lumber is laminated so as to obtain the desired dimensions of the final beam. The adhesives may also be used in the construction of so-called "curtain wall panels." These panels comprise prefabricated wall panels which are made by binding skin materials such as metals, cardboard, plywood, glass and asbestos board, etc. to cores such as foamed plastics, honeycomb cores, insulation board and particle board, etc.

When adhering substrates coated with out compositions, wet combining methods are used. The freshly coated substrates may be adhered at room temperature, under pressures of from 30–300 p.s.i. which are applied for periods of from ½–3 hours. By increasing the temperature, both the pressure and the press time will, of course, be reduced proportionately.

The following examples will further illustrate the embodiment of this invention. In these examples all parts given are by weight unless otherwise noted.

Example I

This example illustrates the preparation of a number of different adhesive formulations typical of this invention.

The procedure utilized in preparing these formulations involved the polymerization of a number of stabilized vinyl acetate homo- or copolymer emulsions using, as an emulsifier for the respective polymerization procedures, 6%, by weight of the monomer charge, of an 88% hydrolyzed, medium viscosity polyvinyl alcohol. Stabilization of the resulting polymer emulsion was achieved, in the first formulation, by the use of a polymerization temperature of 90° C. in conjunction with a hydrogen peroxide catalyst. In the other formulations, stabilization of the respective emulsions was achieved by the utilization of selected comonomers. The B-stage phenolic resin was then added in the form of a 90:10 isopropanol:water solution containing 50%, by weight, of resin solids. The selected curing agent, in the form of an aqueous solution, was added to the blend of the vinyl acetate polymer emulsion and the phenolic resin solution just prior to its use as an adhesive. The following table presents complete data for the formulations which were produced.

emulsion polymerization procedure wherein an elevated polymerization temperatrue is utilized in conjunction with a free radical type catalyst other than hydrogen peroxide. Formulation 4 duplicates the procedure utilized for Formulation 3 with the exception that a hydrogen peroxide catalyst was used in conjunction with the elevated polymerization temperature in order to achieve emulsion stabilization. On the other hand, Formulations 5–7 show the use of selected comonomers within conventional polymerization reaction conditions in order to attain this requisite emulsion stabilization. Thus, except for the various distinctions noted in the table, all reaction conditions were identical. In each case, the resulting vinyl acetate polymer emulsion contained 50%, by weight, resin solids and was prepared by using 5%, by weight of the monomer charge, of an 88% hydrolyzed, medium viscosity polyvinyl alcohol as the emulsifier.

| Formulation Number | Comonomer | Ratio of VlOAc:Comonomer | Catalyst | Polymerization temperature (° C) |
|---|---|---|---|---|
| 1 | | | Benzoyl peroxide | 67 |
| 2 | | | Hydrogen peroxide | 67 |
| 3 | | | Benzoyl peroxide | 88 |
| 4 | | | Hydrogen peroxide | 88 |
| 5 | N-methylol acrylamide | 95:5 | Benzoyl peroxide | 67 |
| 6 | Ethyl acid maleate | 97:3 | do | 67 |
| 7 | Hydroxyethyl acrylate | 90:10 | do | 67 |

B-stage phenolic resin, in the form of a 90:10 isopropanol.—water solution containing 50%, by weight, of resin solids was then added, under agitation, to each of the above described vinyl acetate polymer emulsions in order to determine the compatibility of the resulting systems. These results of the latter determination are presented in the following table:

Formulation No.: Compatibility with resin solution
1 _____ coagulated.
2 _____ coagulated.
3 _____ coagulated.
4 _____ compatible.
5 _____ compatible.
6 _____ compatible.
7 _____ compatible.

| Number | Nature of Vinyl Acetate Polymer | VlOAc Emulsion | | | Grams B-stage resin solids | Curing agent | Gram. equiv. curing agent per 100 grams of total blend |
|---|---|---|---|---|---|---|---|
| | | Ratio of VlOAc:Comonomer | Percent by wt. resin solids | Total grams polymer emulsion in formulation | | | |
| 1 | Homopolymer | | 50 | 100 | 40 | Cr(NO₃)₃ | 0.05 |
| 2 | Copolymer with acrylic acid | 98:2 | 50 | 100 | 40 | Cr(ClO₄)₃ | 0.015 |
| 3 | Copolymer with ethyl acid maleate | 97:3 | 50 | 100 | 40 | Al(NO₃)₃ | 0.02 |
| 4 | Copolymer with hydroxyethyl acrylate | 90:10 | 50 | 100 | 40 | Cr(NO₃)₃ | 0.04 |
| 5 | Copolymer with N-methylol acrylamide | 90:10 | 50 | 100 | 40 | AlCl₃ | 0.06 |

Each of the above described formulations was successfully employed as an adhesive for the bonding of a wide variety of wood, plastic and metal substrates. The resulting adhesive bonds were superior with regard to such factors as static loading and heat resistance of the cured films. This superiority was especially noted in the water resistance exhibited by the cured films of the adhesive systems of this invention.

Example II

This example illustrates the necessity for utilizing stabilized vinyl acetate homo- or copolymer emulsions in the adhesive compositions of this invention. It further illustrates the two procedures available for attaining such stabilized emulsions.

In the following table, Formulations 1 and 2 were prepared by the utilization of a conventional emulsion polymerization technique. Formulation 3 is indicative of the The results summarized above clearly indicate the criticality of using only stabilized polymer emulsions in the adhesive compositions of this invention.

Example III

This example illustrates the high degree of water resistance exhibited by the bonds derived from the adhesive compositions of this invention when compared with conventional polyvinyl acetate emulsions as well as with vinyl acetate polymer emulsion—A-stage phenolic resin adhesive blends, and vinyl acetate polymer emulsion—A-stage phenolic resin adhesive blends modified, respectively, with conventional free acid catalysts and the acidic, metal salt curing agents specified for use in this invention.

The vinyl acetate polymer emulsions utilized in the compositions of this example contained 50%, by weight, resin solids and were prepared using 6%, by weight of the monomer charge, of an 88% hydrolyzed, medium viscosity polyvinyl alcohol as the emulsifying agent. The polymer emulsions utilized in Formulations 1–6, described hereinbelow, were stabilized by the utilization of a polymerization temperature of 90° C. in conjunction with a hydrogen peroxide catalyst in the emulsion polymerization procedure. The polymer emulsions of Formulations 7–11, on the other hand, were stabilized by the utilization of selected comonomers.

The various formulations comprising these vinyl acetate polymer emulsions, some of which also contained other components such as aqueous curing agent solutions, free acids, A- and B-stage phenolic resins, etc., were used to adhere plywood veneers. Thus, the various adhesive formulations were applied, in a 6 mil wet film, to one surface of a number of $\frac{1}{16}''$ thick birchwood veneers. Three of these veneers were then compressed for three hours under a pressure of 75 p.s.i. and a temperature of 75° F. so as to result in the formation of a three ply panel. These specimens were then aged for seven days prior to their being subjected to the tests described below.

In order to compare relative strength and water resistance, a cold water soak test was run on a set of 1" x 6" splints, as prepared by the procedure described hereinabove, wherein the resulting splints were soaked in water at 72° F. for a period of 48 hours. While still wet, the tensile shear strength, in p.s.i., of the adhesive bonds of these plywood test specimens was determined using an Instron Tensile Tester at a rate of 0.2 inch per minute. After being subjected to the tensile shear strength determination, the test specimens were examined so as to determine their percent of wood failure. The percent of wood failure indicates what percentage of the total area of the wood surface, at the interface with the adhesive film, was torn while being subjected to the tensile shear determination. Thus, a high percentage of wood failure indicates a strong adhesive bond since the wood rather than the adhesive bond has been torn. This procedure conforms with Federal Test Method Standard No. 175, entitled, "Adhesives: Methods of Testing," Method 2031, Procedure 4.1.

The various adhesive formulations employed in the aforedescribed procedure are set forth in the following table. The total weight of the respective vinyl acetate polymer emulsions and of the A- and B-stage phenolic resin solutions are presented in grams, while the concentrations of the curing agents and free acids are presented in gram equivalents per 100 grams of the total weight of the blend of vinyl acetate polymer emulsion and the B-stage phenolic resin solution.

The results obtained by employing the above described formulations in the test procedures heretofore described, are set forth in the following table:

| Formulation Number: | Wet Shear Strength Test | |
|---|---|---|
| | Average p.s.i. | Average percent wood tear |
| 1 | *0 | 0 |
| 2 | *0 | 0 |
| 3 | 35 | 0 |
| 4 | 95 | 0 |
| 5 | 190 | 0 |
| 6 | 250 | 10 |
| 7 | 280 | 15 |
| 8 | 320 | 25 |
| 9 | 310 | 10 |
| 10 | 350 | 40 |
| 11 | 280 | 20 |

*3-ply panel voluntarily separated when immersed in water.

It can be seen from the results noted in the above table, that the adhesive compositions of this invention yielded bonds which were vastly superior in water resistance and in shear strength to the other formulations tested.

Summarizing, this invention provides adhesive products based upon blends of vinyl acetate polymer emulsions with a B-stage phenolic resin; said products yielding bonds exhibiting optimum water resistance and high strength. By "optimum water resistance," as used herein and in the claims hereof, is meant a degree of water resistance on the part of the adhesive bonded laminate such that when it is immersed in water, the laminate will not exhibit any ply or laminae separation but will, rather, yield a bond strength and a substrate tear substantially in excess of commercial standards when an attempt is made to effect its delamination.

Variations may, of course, be made in procedures, proportions, and materials without departing from the scope of our invention which is limited only by the following claims.

I claim:
1. The method of making an adhesive composition capable of yielding dry films characterized by optimum water resistance which consists (a) in preparing an aqueous vinyl acetate polymer emulsion which has been stabilized to render the same compatible with a fusible B-stage phenolic resin which is insoluble in water and in aqueous alkali solutions but which is soluble in acetone, the stabilization of said vinyl acetate polymer emulsion having been accomplished by polymerizing a monomer mixture containing at least 80%, by weight, of vinyl acetate with at least one polymerizable comonomer selected from the group consisting of alpha, beta-unsaturated

| Components | Formulation Number | | | | | | | | | | |
|---|---|---|---|---|---|---|---|---|---|---|---|
| | 1 | 2 | 3 | 4 | 5 | 6 | 7 | 8 | 9 | 10 | 11 |
| Polyvinyl acetate emulsion | 100 | 100 | 100 | 100 | 100 | 100 | | | | | |
| 97–3 vinyl acetate–ethyl acid maleate copolymer emulsion | | | | | | | 100 | | | | |
| 90–10 vinyl acetate–N-methylol acrylamide copolymer emulsion | | | | | | | | 100 | 100 | 100 | 100 |
| A-stage phenolic resin solids (in 50%, by weight, solids isopropanol-water solution) | | 40 | 40 | | 40 | | | | | | |
| B-stage phenolic resin solids (in 50%, by weight, solids, isopropanol-water solution) | | | | 40 | | 40 | 40 | 40 | 15 | 65 | 40 |
| Chromic nitrate | | | | | 0.05 | 0.05 | | | 0.05 | 0.05 | |
| Aluminum nitrate | | | | | | | 0.05 | | | | |
| Aluminum chloride | | | | | | | | 0.05 | | | |
| Chromic perchlorate hexahydrate | | | | | | | | | | | 0.05 |
| 20% nitric acid | | | 0.05 | 0.05 | | | | | | | | carboxylic acids, lower mono-alkyl esters of alpha, beta-unsaturated dicarboxylic acids, hydroxyalkyl esters of alpha, beta-unsaturated carboxylic acids, amides of alpha, beta-unsaturated carboxylic acids, and N-alkylol derivatives of amides of alpha, beta-unsaturated carboxylic acids and (b) mixing said stabilized vinyl acetate polymer emulsion with a fusible B-stage phenolic resin which is insoluble in water and in aqueous alkali solutions but which is soluble in acetone and which is dissolved in an organic solvent; the compatibility of said vinyl acetate polymer emulsion being indicated by the absence of coagulation when the organic solvent solution of said B-stage phenolic resin is admixed therewith; and, wherein said B-stage phenolic resin is present in a concentration of from about 30 to 130 parts, by weight, per 100 parts, by weight, of the vinyl acetate polymer resin solids.

2. The method of claim 1 wherein the product of steps (a) and (b) is admixed with an acidic, metal salt curing agent selected from the group consisting of chromic nitrate, chromic perchlorate, aluminum nitrate, and aluminum chloride which is present in a concentration of from about 0.015 to 0.060 gram equivalents per each 100 grams of the total weight of said adhesive composition.

3. An adhesive composition capable of yielding dry films characterized by optimum water resistance comprising (a) an aqueous vinyl acetate polymer emulsion stabilized to render the same compatible with a fusible B-stage phenolic resin which is insoluble in water and in aqueous alkali solutions but which is soluble in acetone; said stabilized vinyl acetate polymer emulsion comprising an aqueous emulsion of a copolymer of vinyl acetate containing at least 80%, by weight, of vinyl acetate with at least one polymerizable comonomer selected from the group consisting of alpha, beta-unsaturated carboxylic acids, lower mono-alkyl esters of alpha, beta-unsaturated dicarboxylic acids, hydroxyalkyl esters of alpha, beta-unsaturated carboxylic acids, amides of alpha, beta-unsaturated carboxylic acids, and N-alkylol derivatives of amides of alpha, beta-unsaturated carboxylic acids; said stabilized vinyl acetate polymer emulsion being admixed with (b) a fusible B-stage phenolic resin which is insoluble in water and in aqueous alkali solutions but which is soluble in acetone and which is dissolved in an organic solvent; the compatibility of said vinyl acetate polymer emulsion being indicated by the absence of coagulation when the organic solvent solution of said B-stage phenolic resin is admixed therewith; and, wherein said B-stage phenolic resin is present in a concentration of from about 30 to 130 parts, by weight, per 100 parts, by weight, of the vinyl acetate polymer resin solids.

4. The adhesive composition of claim 3 admixed with (c) an acidic, metal curing agent selected from the group consisting of chromic nitrate, chromic perchlorate, aluminum nitrate, and aluminum chloride which is present in a concentration of from about 0.015 to 0.060 gram equivalents per each 100 grams of the total weight of said adhesive composition.

5. A solid substrate coated with a dried adhesive film exhibiting optimum water resistance, said film being deposited from an aqueous adhesive composition comprising a mixture of (a) a stabilized aqueous emulsion of a polymer of vinyl acetate selected from the group consisting of polyvinyl acetate and copolymers containing at least about 80%, by weight, of vinyl acetate with at least one polymerizable comonomer selected from the group consisting of alpha, beta-unsaturated carboxylic acids, lower mono-alkyl esters of alpha, beta-unsaturated dicarboxylic acids, hydroxyalkyl esters of alpha, beta-unsaturated carboxylic acids, amides of alpha, beta-unsaturated carboxylic acids, and N-alkylol derivatives of amides of alpha, beta-unsaturated carboxylic acids; (b) a fusible B-stage phenolic resin which is insoluble in water and in aqueous alkali solutions but which is soluble in acetone; and, (c) an acidic, metal salt curing agent selected from the group consisting of chromic nitrate, chromic perchlorate, aluminum nitrate, and aluminum chloride which is present in a concentration of from about 0.015 to 0.060 gram equivalents per each 100 grams of the total weight of said adhesive composition; the stability of said vinyl acetate polymer emulsion being indicated by the absence of coagulation when the organic solvent solution of said B-stage phenolic resin is admixed therewith; and, wherein said B-stage phenolic resin is present in a concentration of from about 30 to 130 parts, by weight, per 100 parts, by weight, of the vinyl acetate polymer resin solids.

6. A laminate comprising at least two laminae, said laminae being adhesively bonded with a dried adhesive film exhibiting optimum water resistance, said film being deposited from an aqueous adhesive composition comprising a mixture of (a) a stabilized aqueous emulsion of a polymer of vinyl acetate selected from the group consisting of polyvinyl acetate and copolymers containing at least about 80%, by weight, of vinyl acetate with at least one polymerizable comonomer selected from the group consisting of alpha, beta-unsaturated carboxylic acids, lower mono-alkyl esters of alpha, beta-unsaturated dicarboxylic acids, hydroxyalkyl esters of alpha, beta-unsaturated carboxylic acids, amides of alpha, beta-unsaturated carboxylic acids, and N-alkylol derivatives of amides of alpha, beta-unsaturated carboxylic acids; (b) a fusible B-stage phenolic resin which is insoluble in water and in aqueous alkali solutions but which is soluble in acetone; and, (c) an acidic, metal curing agent selected from the group consisting of chromic nitrate, chromic perchlorate, aluminum nitrate, and aluminum chloride which is present in a concentration of from about 0.015 to 0.060 gram equivalents per each 100 grams of the total weight of said adhesive composition; the stability of said vinyl acetate polymer emulsion being indicated by the absence of coagulation when the organic solvent solution of said B-stage phenolic resin is admixed therewith; and, wherein said B-stage phenolic resin is present in a concentration of from about 30 to 130 parts, by weight, per 100 parts, by weight, of the vinyl acetate polymer resin solids.

References Cited

UNITED STATES PATENTS

| | | | |
|---|---|---|---|
| 2,902,458 | 9/1959 | Teppema | 260—29.3 |
| 2,902,459 | 9/1959 | Teppema | 260—29.3 |
| 3,041,301 | 6/1962 | Armour | 260—29.3 |
| 3,274,048 | 9/1966 | Armour et al. | 260—29.3 |

SAMUEL H. BLECH, *Primary Examiner.*

JOHN C. BLEUTGE, *Assistant Examiner.*

U.S. Cl. X.R.

117—161; 156—335; 161—204, 205, 215, 218, 251, 262, 264; 260—29.3, 844